(12) United States Patent
Favaretto

(10) Patent No.: US 10,940,895 B2
(45) Date of Patent: Mar. 9, 2021

(54) SPORTS CAR COCKPIT

(71) Applicant: FERRARI S.p.A., Modena (IT)

(72) Inventor: Fabrizio Favaretto, Formigine (IT)

(73) Assignee: FERRARI S.P.A., Modena (IT)

( * ) Notice: Subject to any disclaimer, the term of this patent is extended or adjusted under 35 U.S.C. 154(b) by 87 days.

(21) Appl. No.: 16/434,431

(22) Filed: Jun. 7, 2019

(65) Prior Publication Data

US 2019/0375464 A1  Dec. 12, 2019

(30) Foreign Application Priority Data

Jun. 11, 2018 (IT) .................... 102018000006199

(51) Int. Cl.
 *B60J 7/00* (2006.01)
 *B62D 29/00* (2006.01)
 *B62D 25/00* (2006.01)

(52) U.S. Cl.
 CPC ............ *B62D 29/001* (2013.01); *B62D 25/00* (2013.01)

(58) Field of Classification Search
 CPC ... B60R 1/00; B60R 2300/105; B60N 2/2812; B60N 2/688; H04N 7/181; B60K 16/00; A63G 27/02; B66B 17/12; B66B 2002/7462; B66B 2002/7483; E04B 2002/7462; E04B 2002/7483
 See application file for complete search history.

(56) References Cited

U.S. PATENT DOCUMENTS

| | | | | | |
|---|---|---|---|---|---|
| 2,061,760 A | * | 11/1936 | Fisher | ...................... | B60J 10/70 296/93 |
| 2,115,913 A | * | 5/1938 | Hicks | ..................... | B62D 23/00 296/203.01 |
| 2,151,229 A | * | 3/1939 | Piroumoff | .............. | B62D 33/06 180/54.1 |
| 2,191,009 A | * | 2/1940 | Clarke | ................... | B60J 1/2055 296/97.4 |
| 2,225,976 A | * | 12/1940 | Cadwallader | .......... | B62D 23/00 296/203.01 |
| 2,304,691 A | * | 12/1942 | Hund | ....................... | B60S 1/54 52/171.2 |
| 2,464,696 A | * | 3/1949 | Lelong | ....................... | B60J 1/06 296/201 |
| 2,494,980 A | * | 1/1950 | Herman | .................. | B60N 3/002 108/45 |
| 2,556,062 A | * | 6/1951 | Buehrig | .................... | B60J 7/106 296/218 |

(Continued)

FOREIGN PATENT DOCUMENTS

GB   1246803 A   9/1971

OTHER PUBLICATIONS

Search Report issued in Italian Application No. 201800006199, completed Mar. 28, 2019; 8 pages.

*Primary Examiner* — Kiran B Patel

(74) *Attorney, Agent, or Firm* — Cantor Colburn LLP

(57) ABSTRACT

Sports car including a cockpit equipped with a windscreen that delimits the cockpit, the windscreen being supported by a peripheral frame made of high-resistance material including an upper crossbeam at the top, a lower crossbeam at the bottom and a pair of side uprights connecting said upper and lower crossbeams, the windscreen including a front central upright arranged between said front side uprights to connect said upper and lower crossbeams.

17 Claims, 8 Drawing Sheets

(56) References Cited

U.S. PATENT DOCUMENTS

| | | | | |
|---|---|---|---|---|
| 2,642,611 | A * | 6/1953 | Anderson | B60S 1/3418 15/250.34 |
| 2,647,289 | A * | 8/1953 | Harbert | B60J 10/70 52/208 |
| 2,912,057 | A * | 11/1959 | Wagner | B60K 11/04 180/68.4 |
| 3,232,368 | A * | 2/1966 | Sullivan | B60H 3/06 180/68.3 |
| 4,089,542 | A * | 5/1978 | Westerman | B60F 5/006 180/208 |
| 4,326,445 | A * | 4/1982 | Bemiss | B60K 15/00 296/187.07 |
| 4,336,964 | A * | 6/1982 | Pivar | B60J 5/0487 296/77.1 |
| 7,311,347 | B1 * | 12/2007 | Aller | A63B 55/61 296/77.1 |
| 7,506,911 | B2 * | 3/2009 | Lee | B62D 25/04 296/193.06 |
| 7,770,506 | B2 * | 8/2010 | Johnson | F41H 7/044 89/36.09 |
| 7,942,369 | B2 * | 5/2011 | Mahieu | B64C 1/1476 244/129.3 |
| 9,045,014 | B1 * | 6/2015 | Verhoff | B62D 21/152 |
| D738,784 | S * | 9/2015 | Tunis | D12/12 |
| 9,365,241 | B1 * | 6/2016 | Taracko | B62D 23/005 |
| 9,452,784 | B2 * | 9/2016 | Batt | F41H 7/042 |
| 9,707,869 | B1 * | 7/2017 | Messina | B62D 63/025 |
| 9,738,186 | B2 * | 8/2017 | Krueger | B60N 2/4242 |
| 10,144,389 | B2 * | 12/2018 | Archer | B60R 25/08 |
| D864,031 | S * | 10/2019 | Gander | D12/93 |
| 10,495,419 | B1 * | 12/2019 | Krueger | F41H 7/044 |
| 2006/0119705 | A1 | 6/2006 | Liao | |
| 2007/0194604 | A1 * | 8/2007 | Nygaard | B62D 25/04 296/187.09 |
| 2007/0298705 | A1 | 12/2007 | Yoshida | |
| 2010/0019538 | A1 * | 1/2010 | Kiley | F41H 7/048 296/187.01 |
| 2010/0037761 | A1 * | 2/2010 | Boczek | F41H 7/044 89/36.08 |
| 2010/0163330 | A1 * | 7/2010 | Halliday | F41H 7/044 180/295 |
| 2015/0084363 | A1 * | 3/2015 | Neag | B60J 1/04 296/90 |
| 2016/0046336 | A1 * | 2/2016 | Norman | B65D 85/68 180/312 |
| 2016/0068048 | A1 * | 3/2016 | Kilduff | B60J 1/007 296/84.1 |
| 2016/0075217 | A1 * | 3/2016 | Trupiano | B60J 1/006 296/90 |
| 2016/0304129 | A1 * | 10/2016 | Hamdoon | B62D 25/04 |
| 2019/0217899 | A1 * | 7/2019 | Ikeda | B62D 25/04 |
| 2019/0225275 | A1 * | 7/2019 | Miura | B60J 1/02 |
| 2019/0233018 | A1 * | 8/2019 | Tanaka | B60R 21/215 |
| 2019/0291388 | A1 * | 9/2019 | Bauerle | F21S 43/14 |
| 2019/0375269 | A1 * | 12/2019 | Favaretto | B60H 1/245 |

\* cited by examiner

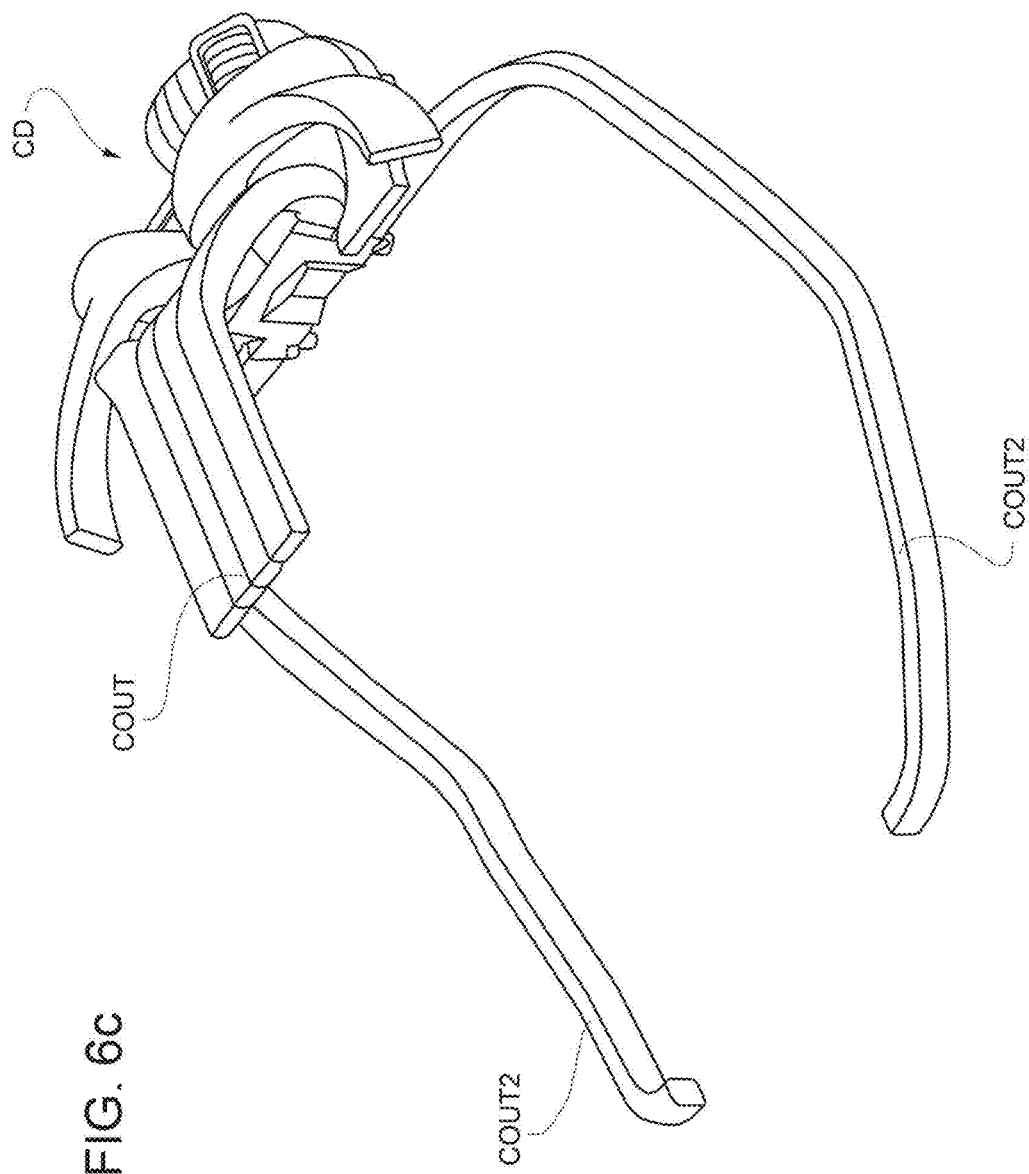

SPORTS CAR COCKPIT

CROSS-REFERENCE TO RELATED APPLICATIONS

This patent application claims priority from Italian patent application no. 102018000006199 filed on Jun. 11, 2018, the entire disclosure of which is incorporated herein by reference.

FIELD OF THE INVENTION

The present invention relates to the field of sports car cockpits.

STATE OF THE ART

Cars include a cockpit housing two or more seats, one of which is a driver's seat.

The cockpit defines a survival cell incorporated in the structure of the car chassis.

The chassis includes crossbeams and side members.

The doors, when closed, often contribute to defining the aforementioned survival cell.

Generally, the driver's seat is arranged on one side of the cockpit in a front position to keep the road under control.

The car roof performs the function of protecting the passengers from the atmospheric agents and in the event of the car overturning.

The roof is generally connected to the vehicle chassis through a pair of front uprights and a pair of side rear uprights, laterally arranged.

A windscreen is set between the front uprights.

In sports cars, both for aesthetic reasons and for aerodynamic reasons, the windscreen is very wide and inclined. Therefore, the front uprights are particularly long and inclined as well as quite spaced from each other. These conditions urge the creation of particularly sturdy and bulky front side uprights.

In the body of the vehicle, generally below the profile of the front hood, a lower crossbeam joins the front uprights together.

An upper crossbeam, on the other hand, connects the protruding ends of the front uprights. This upper crossbeam is generally integrated in the car roof and is particularly evident when the car has a reclosable or removable roof. Also in this case, thickening this crossbeam is not possible due to aesthetic and aerodynamic reasons.

SUMMARY OF THE INVENTION

The object of the present invention is to identify a sturdy cockpit, even in the event of the car overturning, which at the same time allows reducing a cross section of the front side uprights.

The basic idea of the present invention is to provide a third front upright interposed between the two front side uprights to connect the lower crossbeam integrated in the car body to the upper crossbeam integrated in the car roof. Said upright is preferably centrally arranged between the two front side uprights. Hereinafter, in a non-limiting manner, it is called a central upright.

It can be arranged outside the cockpit and spaced from the windscreen, or it can be arranged inside the cockpit or integrated in the windscreen, thus dividing it into a right portion and a left portion.

Preferably, the windscreen wiper arms, when at rest, are hidden by said central upright. When the central upright is arranged inside the cockpit or integrated in the windscreen then the wiper arms, when at rest, are superimposed on the central upright. When the upright is arranged outside the cockpit, then the wiper arms are preferably hidden between the central upright and the windscreen.

Regardless of the aesthetic questions, an alignment of the windscreen wiper arms with said central upright significantly improves the aerodynamics of the sports car. The car is further equipped with an air conditioning system that includes an inner channel diffusing the air conditioned by an air conditioning device in the cockpit and an outer channel that conveys the ambient air to the conditioning device.

According to a first preferred variant of the invention, which is combined with any of the aforementioned variants, the inner and/or the outer channel of the vehicle conditioning system is also connected to the roof in a central and longitudinal position of the roof, in a single piece with said central upright.

The inner channel diffuses the conditioned air produced by the conditioning device in the cockpit, whereas the outer channel leads the fresh ambient air to the conditioning device.

Therefore, said central upright preferably performs a dual function, namely strengthening the cockpit and channelling the conditioned air into the cockpit.

If one or both channels are made with high-resistance tubular elements, then the central upright and said channel(s) provide a single element for strengthening the cockpit, especially in the event of overturning.

When the conditioning device is arranged at the front of the cockpit, then the front central upright can be made of a tubular element in pneumatic communication with said inner channel to lead the conditioned air to the roof from where it is diffused in the cockpit.

The conditioning device can be arranged at the rear of the cockpit, then the inner channel is connected to the car conditioning device through any (or more) of the rear roof uprights or directly by creating a further rear central upright arranged between the rear side uprights.

Also in this case the front central upright can be made with a tubular element to lead the conditioned air from the conditioning device, arranged at the rear of the cockpit, to the dashboard of the vehicle, passing through the roof. According to another preferred variant of the invention, also the outer channel is arranged on the roof, running above and parallel to the inner channel.

Also in this case, the ambient air can be led to the conditioning device by means of a rear side upright or a rear central upright defined by a tubular element.

This rear central upright has a dual function, namely it allows stiffening the cockpit and making a portion of the aforementioned inner air conditioning channel that connects the conditioning device to the roof or to the dashboard. Therefore, a single component for strengthening the cockpit is defined between the rear central upright, the inner and/or the outer channel and the front central upright, centrally arranged with respect to the longitudinal development of the car and connected at the opposite ends to the car chassis.

According to a preferred variant of the invention, the front central upright is hidden from the driver's view by means of a display internally superimposed on the central upright.

One or more cameras are connected to the central upright and aligned with the driver's line of sight and transmit in real time, while said display reproduces the images captured by said cameras. Therefore, the display cancels the driver's perception of the presence of the central upright.

The same technology can be implemented for the front side uprights and/or for the rear side uprights.

Therefore, further cameras can be applied to the front uprights as described in relation to the front central upright. The camera(s) applied to the upright or to the uprights are arranged so as to be aligned with a driver's line of sight. Advantageously, the driver sees on the displays a corresponding solid angle of view hidden by the upright, thus losing the perception of the existence of the upright(s).

Possibly, even the rear window can be replaced by a display that reproduces the same images thus realistically replacing the rear window of the car.

The sports car roof can be partially removed. For example, both the outer and inner channel can be concentrated in a central strip of the roof that runs longitudinally between the seats of the sports car, so that the roof portions above the head of the passengers of the aforementioned seats can be removed or opened. For example, both the outer and inner channels can be concentrated in two longitudinal side strips, each close to the car windows, whereas the central part of the roof above both seats can be removed or opened.

The claims describe preferred variants of the invention, forming an integral part of the present description.

BRIEF DESCRIPTION OF THE FIGURES

Further aims and advantages of the present invention will become clear from the following detailed description of an embodiment of the same (and its variants) and from the annexed drawings given purely as an explanatory and non-limiting example, in which:

FIG. 6c shows a perspective view of the portion shown in FIG. 6b.

The same numbers and the same reference letters in the figures identify the same elements or components.

In the present description, the term "second" component does not imply the presence of a "first" component. These terms are in fact used only as labels to differentiate components and should not be meant in a limiting way, unless otherwise specified in the description.

DETAILED DESCRIPTION OF EXEMPLARY EMBODIMENT

Figure 1:
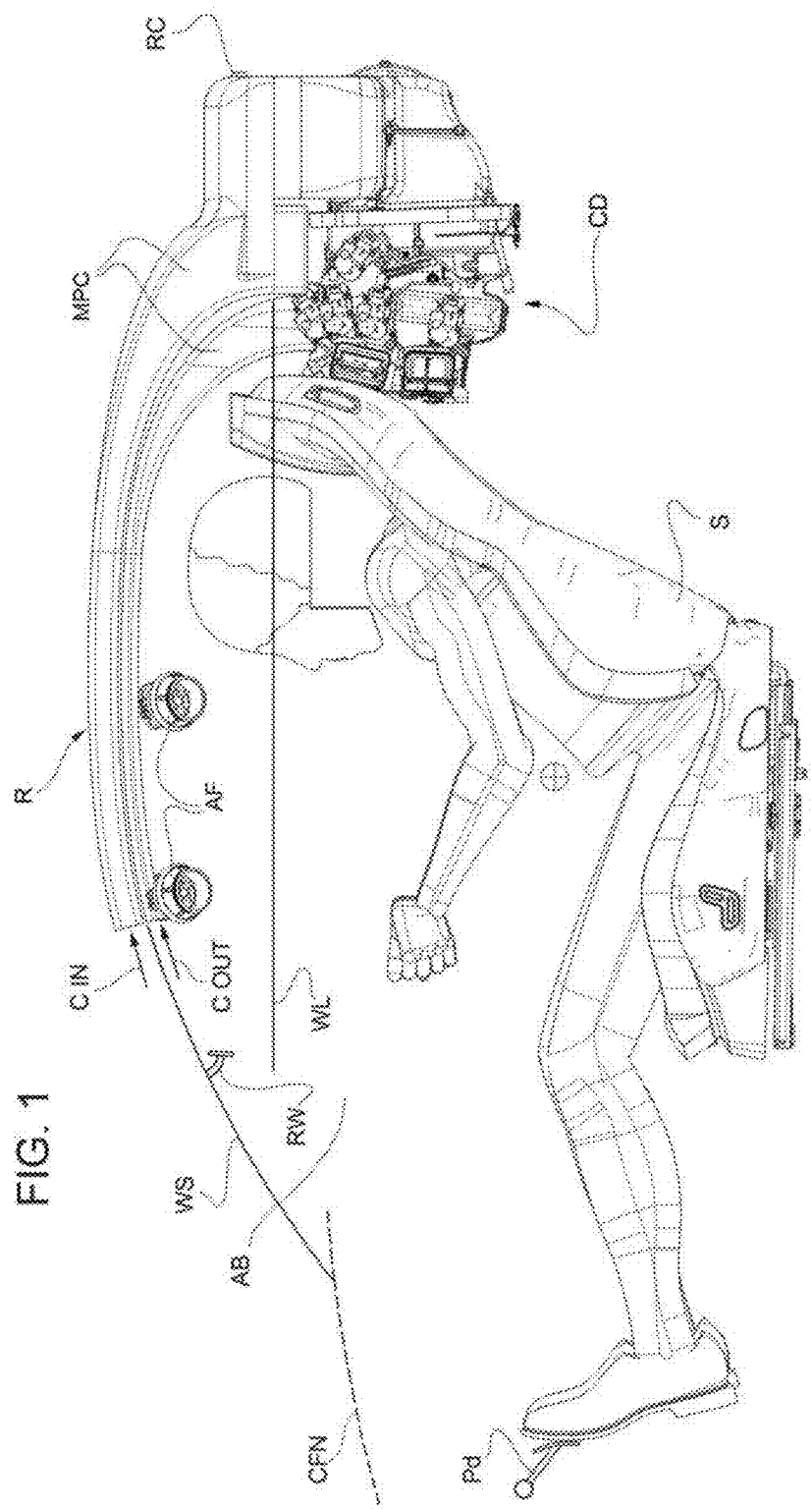
FIG. 1 shows a side view of a portion of a sports car according to a preferred example of the present invention.
Figure 2:
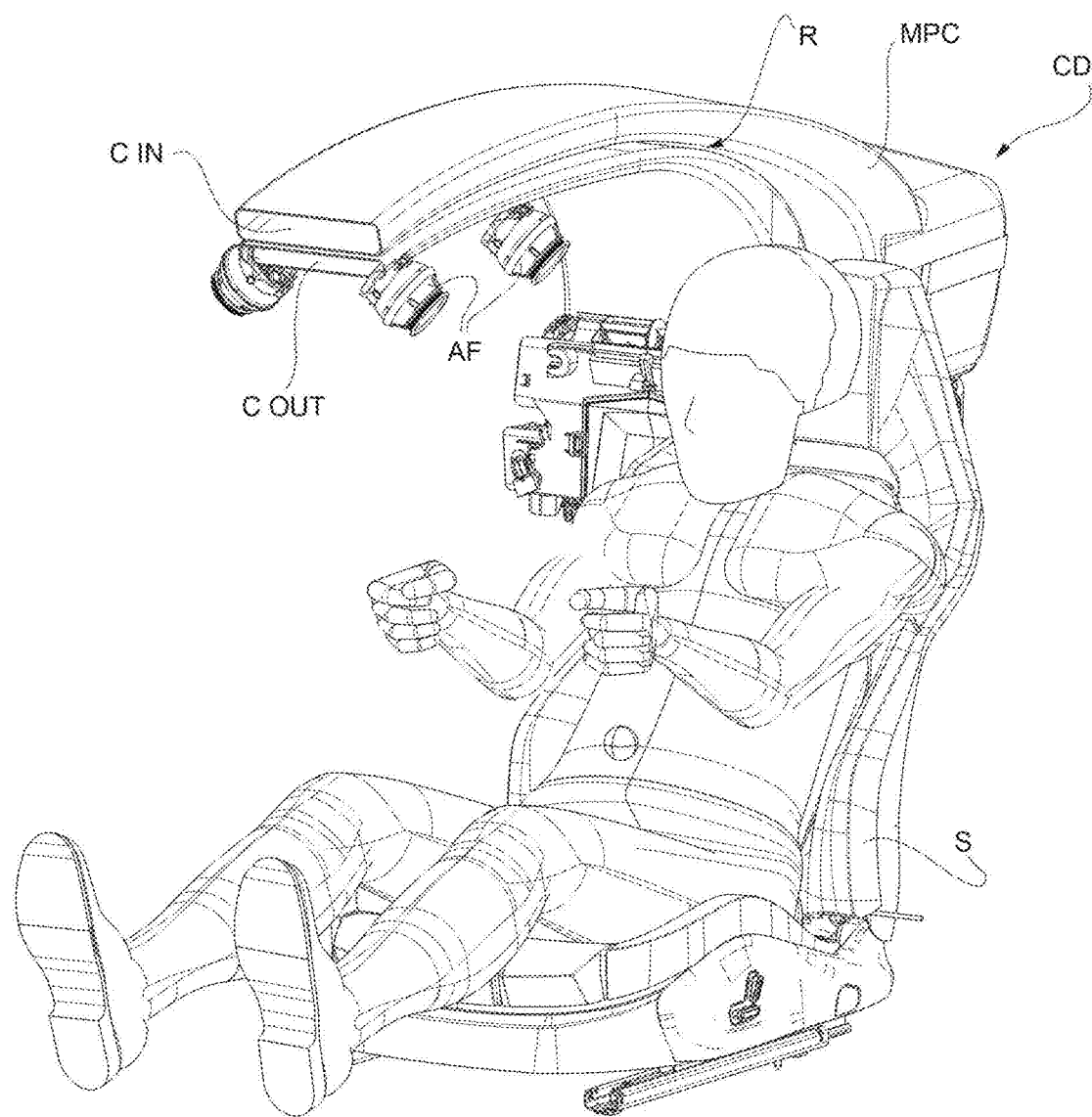
FIG. 2 shows a perspective view of the portion of FIG. 1.

FIGS. 1 and 2 show some parts of a sports car, including a cockpit AB, a seat S and a roof R, according to a preferred example of the present invention.

It is clearly shown a lowered seat S typical of sports cars and an extended driving position with the driver's legs and arms extended forward.

The vehicle conditioning system CD is e.g. arranged at the rear of the driver's seat, below the line of sight WL and preferably immediately below it.

It can also be arranged at the front of the cockpit.

The terms front and rear relating to the cockpit are clear to the person skilled in the art.

The car roof R is very low and is just above the headrest of the vehicle seat, joining behind the headrest with the tail of the car that is evidently a two-seat car.

The car can be equipped with two additional small seats in a 2+2 configuration.

Figure 5:
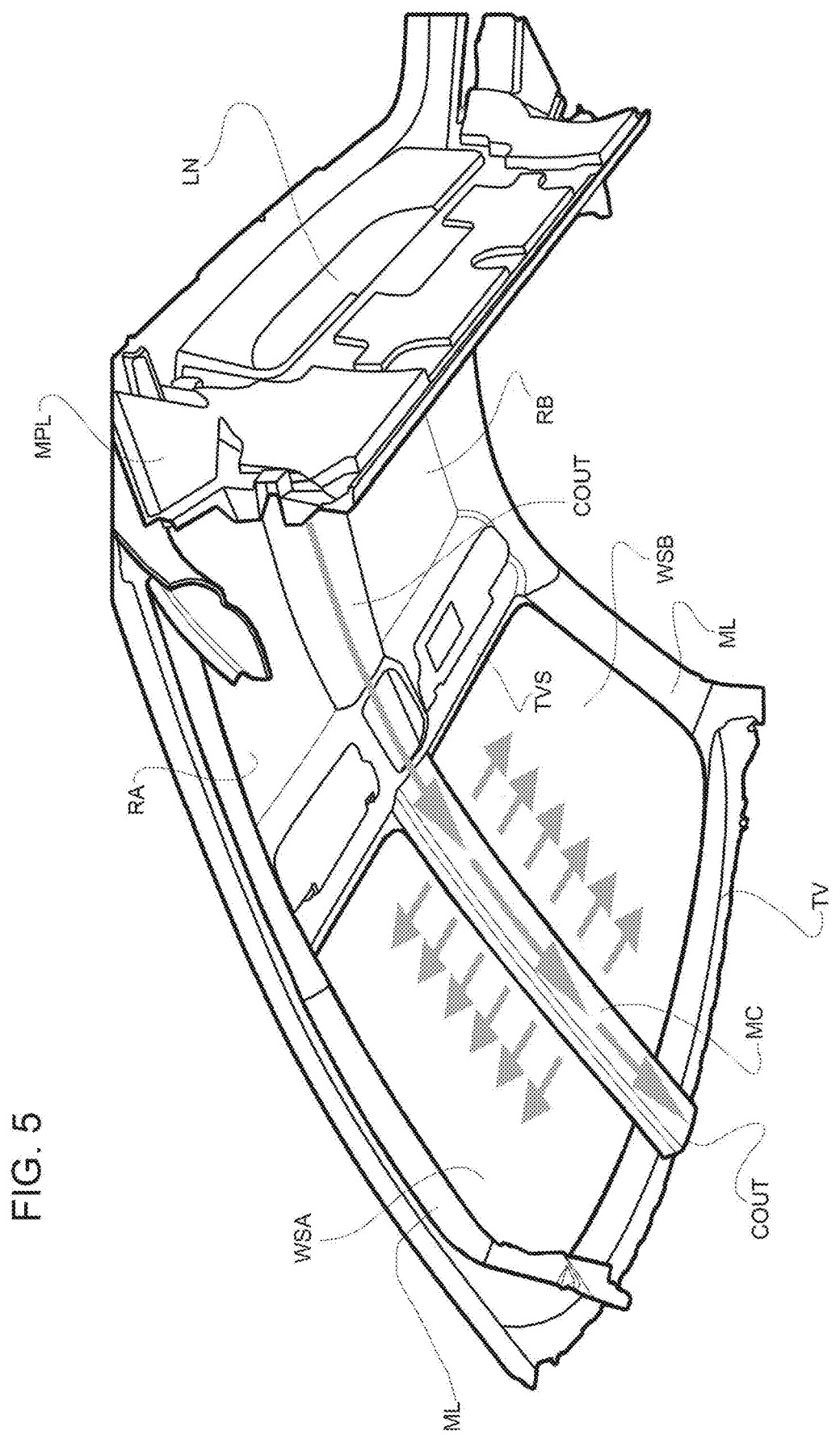
FIG. 5 shows a perspective view from below of a vehicle roof according to one of the examples of FIGS. 3 and 4.

The car windscreen is surrounded by a frame made of a high-resistance material comprising an upper crossbeam TVS shown in FIG. 5 integrated in the roof R.

The roof can be of any material, even of canvas.

The windscreen frame further comprises a lower crossbeam TV, approximately parallel to the upper crossbeam, incorporated in the car body between the dashboard and the front hood, which is part of the car chassis.

Furthermore, the windscreen frame comprises a pair of front side uprights ML that connect the upper and the lower crossbeams.

According to the present invention, the upper crossbeam and the lower crossbeam are also interconnected by means of a front central upright MC, arranged between the front side uprights ML.

It strengthens the cockpit by cooperating with the front side uprights to connect the upper crossbeam and possibly the roof R to the car body.

Since the roof is connected to the tail of the car, the conditioning device CD can be arranged in a position approximately tangent to the rear part of the roof. As shown in FIG. 1, the front hood line CFN is located just above the pedals Pd thanks to the space that is freed up by installing the conditioning device behind the driver's seat S.

According to another preferred variant of the invention, the conditioning device is arranged behind the headrest, namely it interferes with the driver's line of sight. Then, preferably, the rear-view mirror RW is replaced by a display that reproduces the images captured, in real time, by a rear-facing camera RC. Possibly, also the rear window can be replaced by a display that reproduces the same images captured in real time, thus realistically replacing the rear window of the car.

Advantageously, having the conditioning device very close to the roof allows the direct cooling of the cockpit through the vehicle roof.

According to a preferred variant of the present invention, the air conditioning channel Cout, also called "inner channel", runs along the roof longitudinally and preferably centrally with respect to the development of the car from the conditioning device CD forward, towards the windscreen WS but not necessarily up to the windscreen.

Special openings are provided in the air conditioning channel Cout to diffuse the conditioned air in the cockpit AB.

When the car is equipped with a rear window LN, see FIG. 5, the conditioned air from the conditioning device CD is channelled into the channel Cout through a rear side upright MPL.

Otherwise, if the presence of a rear window is not envisaged, then the channel Cout directly reaches the conditioning device CD by means of a rear central upright, as shown in FIG. 2.

Advantageously, since the roof R of the cockpit of a sports car is closer than the dashboard to the trunk of the passengers, an optimal conditioning of the cockpit is achieved though maintaining a low air flow speed. Preferably, the air conditioning channel Cout is associated with adjustable vents AF, one or more for each of the two seats of the car.

According to another preferred variant of the invention, not shown, the conditioning device is arranged at the front of the cockpit and the channel Cout is connected thereto through the aforementioned front central upright, specifically designed to connect the conditioning device arranged at the front of the cockpit and the channel Cout integrated in the roof.

When, on the other hand, the conditioning device is arranged at the rear of the cockpit, then the aforementioned front central upright MC can be implemented to connect the channel Cout integrated in the roof with the car dashboard in which additional vents and slots are integrated.

In both cases, the front central upright MC also performs the function of channelling conditioned air.

According to a preferred variant of the invention, this air conditioning channel Cout is made of a high-resistance material, high-resistance metal and/or carbon, and is connected to the respective ends of the supporting frame or chassis F of the car. In particular, FIG. 5 shows a preferred variant of the invention in which the air conditioning channel defined by the aforementioned central upright MC extends forward, thus dividing the windscreen WS into a right portion WSA and a left portion WSB and then joining the crossbeam TV of the supporting frame F.

At the rear, the inner and/or outer channel can be connected directly to the car chassis through the aforementioned rear central upright MPC or through the rear side uprights MPL, which are generally much sturdier and bulkier than the front uprights. In this case, it is then defined a substantially Y-shaped high-resistance structure. Preferably, the two portions of right and left windscreen are mirror-like to each other.

The front central upright MC can be arranged completely inside the cockpit or completely outside the cockpit so that the windscreen WS can be made in a single piece. When it is completely outside, the arms of the windscreen wipers can be aligned, when at rest, between the front central upright MC and the windscreen.

This arrangement of the wiper arms improves the relative aerodynamic impact.

Figure 6A:
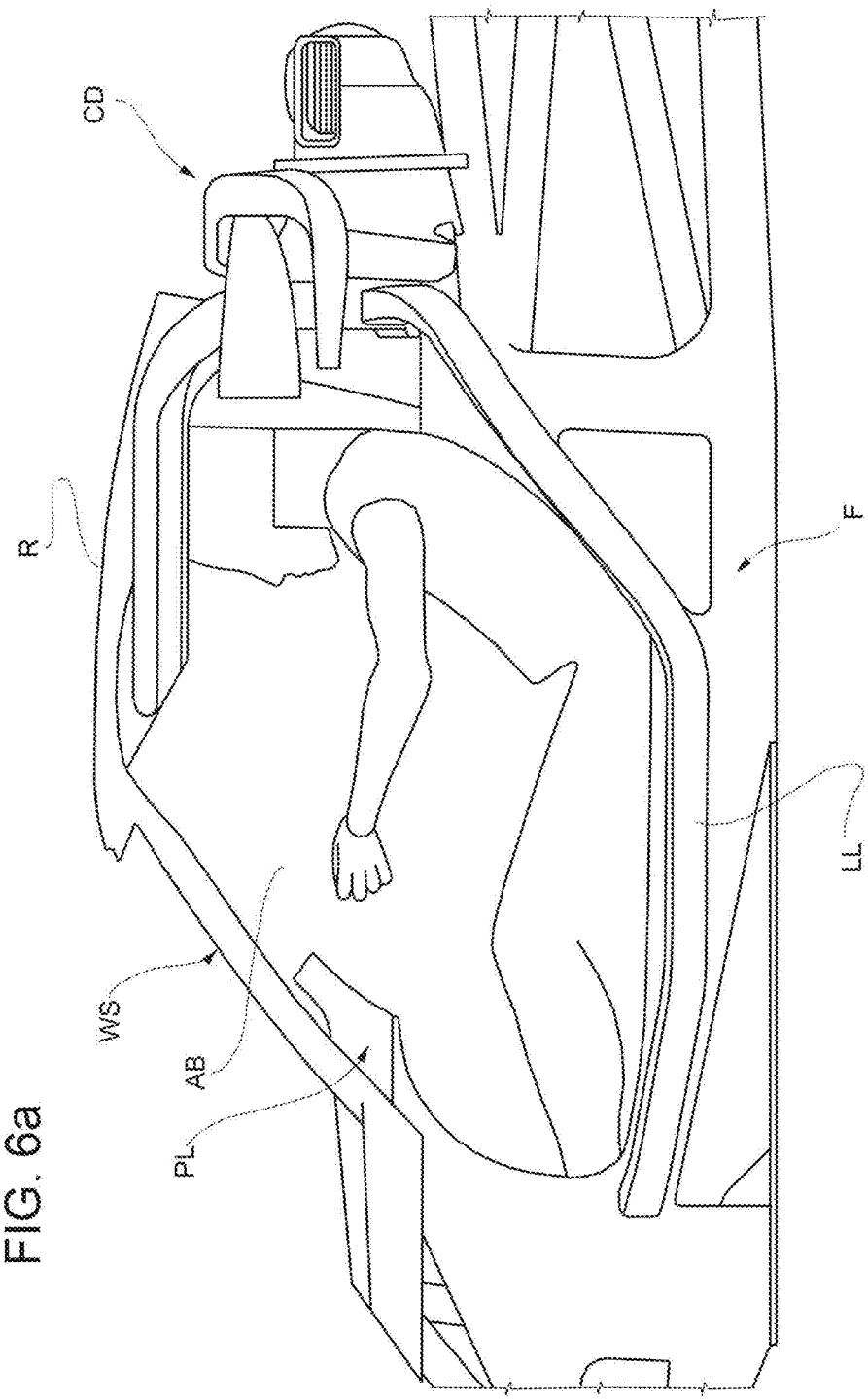
FIGS. 6a and 6b show two same side views, wherein the first view 6a shows a portion of a sports car with parts removed and the second view shows a corresponding part of an example of a conditioning system for the sports car cockpit.
Figure 6B:
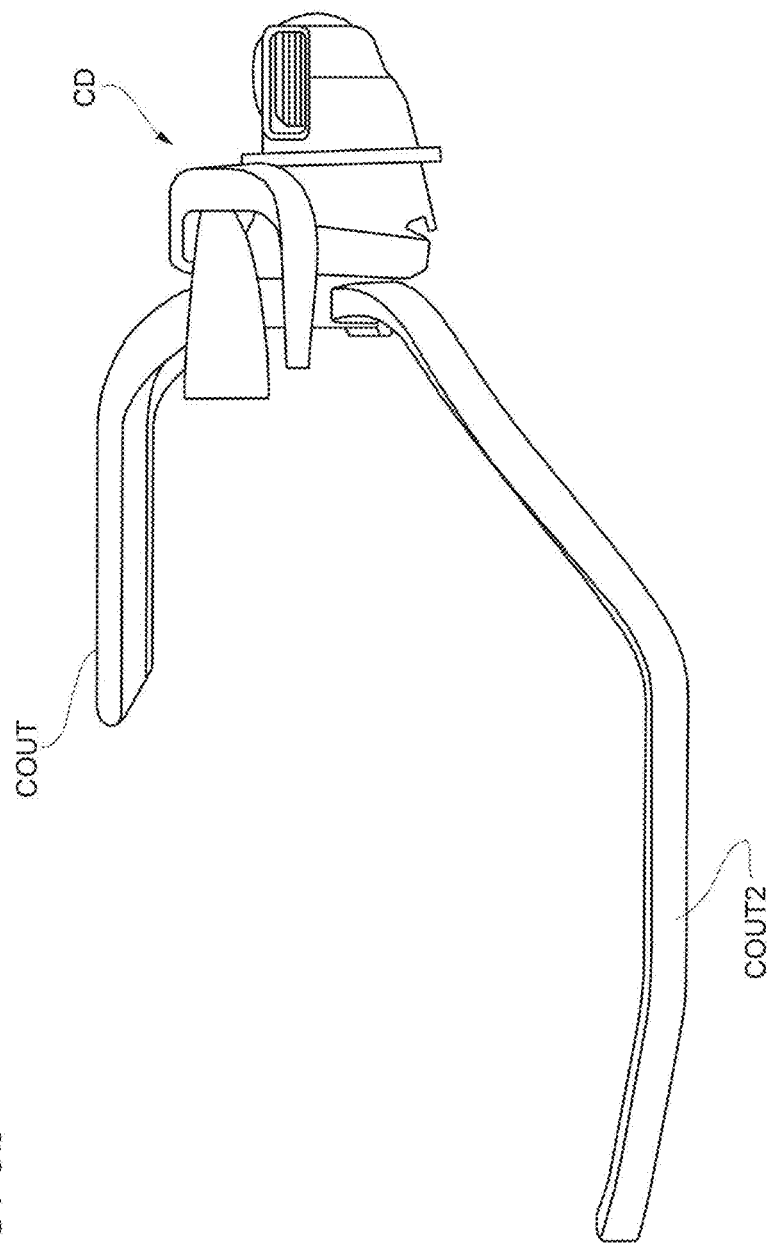

According to another preferred variant of the invention, which is combined with any one of the previous variants, FIG. 6a shows a side portion of the cockpit AB of a sports car. There are side longitudinal members LL that are close, on both sides of the car, to the lower edges of the cockpit access openings AB. They generally form an integral part of the cockpit floor PVM.

These longitudinal members LL are made of tubular elements of high-resistance material and preferably laterally define the cockpit floor inside which the seats S are fixed, thus helping to define part of the chassis F of the car and a survival cell for the passengers.

According to a preferred implementation of the invention, also these side longitudinal members define a portion Cout2 of the inner channel that allows leading towards the legs and/or the dashboard the air conditioned by the aforesaid conditioning device CD. The car dashboard can be equipped with air vents to help spread the conditioned air.

This solution is particularly convenient when the front central upright does not perform the further function of channelling the conditioned air.

According to a further preferred variant of the present invention, which can be combined with any of the previous variants, the fresh air entering the conditioning system is channelled through one or more outer channels, at least one of which has an outside opening facing forward, so that air circulation is natural due to the relative forward movement of the sports car. This creates a so-called "dynamic air intake" whose flow rate depends, in the absence of any control, on the relative speed between the vehicle and the ambient air.

Outer channels can be made in the sides of the vehicle immediately behind the cockpit access doors SP (shown in FIGS. 3 and 4).

According to a preferred variant of the invention, an outer channel Cin is made on the roof, superimposed on the inner channel Cout.

In addition or as an alternative to the inner channel Cout, the outer channel Cin arranged on the car roof can be made of high-resistance material to perform the structural function of integrating into the vehicle frame and a function of channelling and conveying the outside air. A device can be arranged between the outer channel and the conditioning device CD to separate the air from the water possibly collected while the vehicle advances in the rain. The fact of moving the conditioned air thanks to the motion of the car is extremely advantageous when the car is electric. In fact, a reduction in the aerodynamic efficiency of the vehicle in favour of a natural circulation of the conditioned air in the cockpit is more advantageous than keeping an electric fan running, especially when the energy available is limited as in an electric car.

Preferably, a partialization of the air flow captured from the outside can be achieved by means of an electrically driven movable partition P, which evidently absorbs energy only when activated for an adjustment. Nevertheless, an electric fan VE is provided to allow ventilation even when the vehicle is stationary or proceeding at very low speed. Therefore, according to this preferred variant of the invention, the adjustment of the partition and the operation of the electric fan VE are coordinated. Preferably, the fan supplies the dynamic air intake when it is approximately completely open.

Preferably, when the car is stacked in the traffic and proceeds at a very variable speed, the partition is open in a predetermined intermediate opening condition and the electric fan VE is activated to maintain the air flow diffused in the cockpit approximately constant at a predetermined flow value.

Figure 3A:
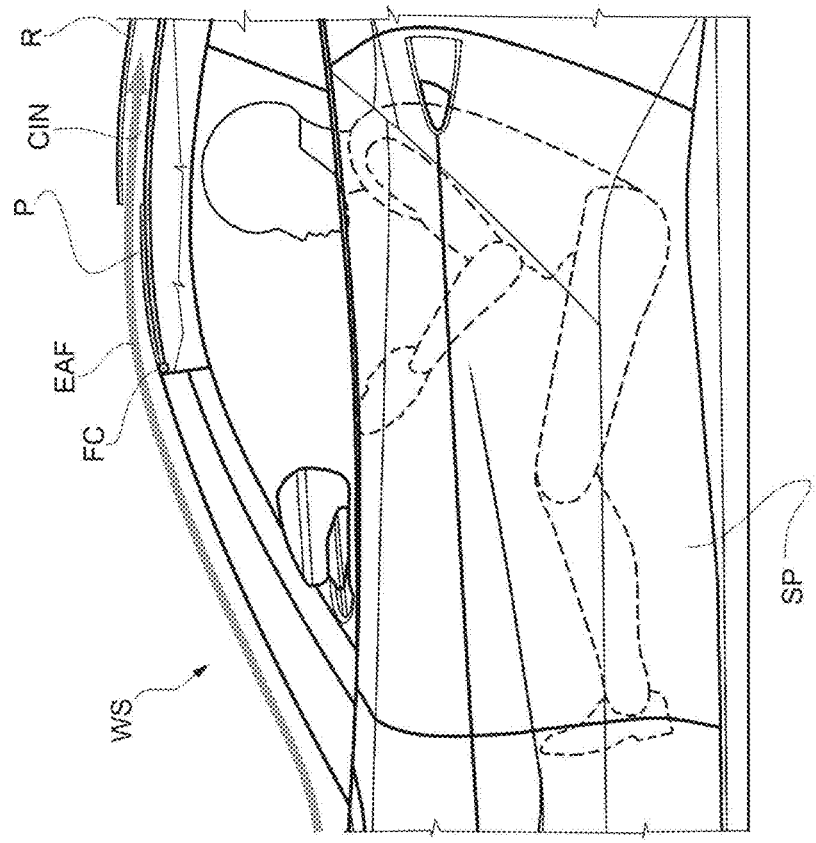
FIGS. 3a and 3b show a side view of a portion of a sports car according to a preferred example of the present invention in two different operating conditions.
Figure 3B:
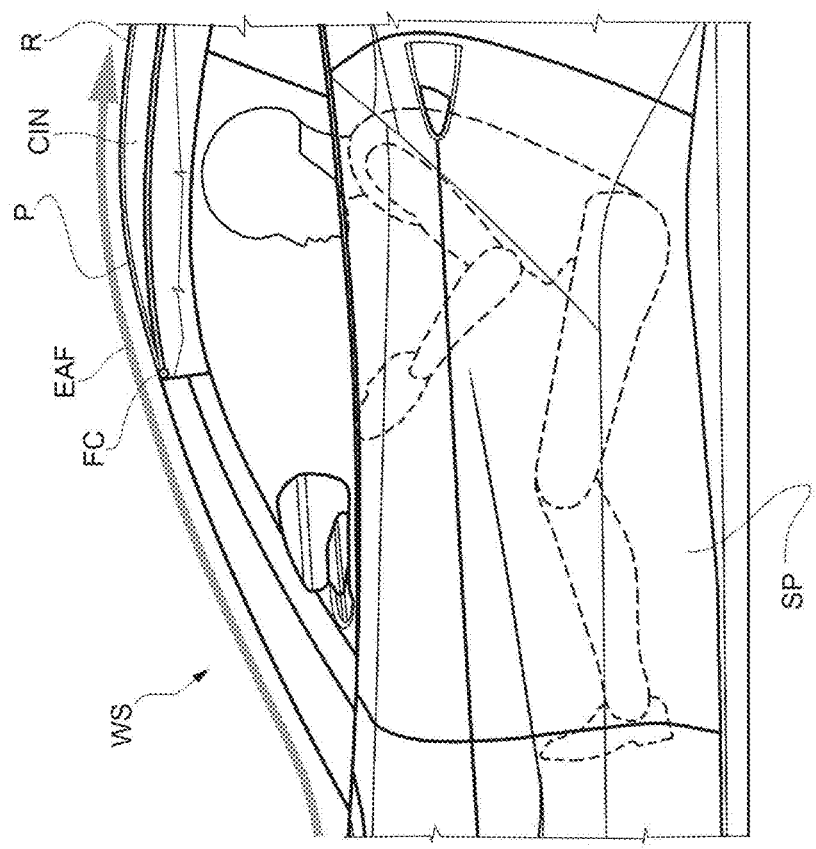

Furthermore, the movable partition P can optimize the aerodynamic efficiency of the vehicle when the dynamic air intake is completely closed. In particular, it can be hinged in a position close to the windscreen WS, gently connecting the windscreen to the outside opening of the outer channel Cin. With reference to FIGS. 3a and 3b, there is shown one or an example of a movable partition P in two opposite operating conditions, respectively completely closed and completely open.

Figure 4B:
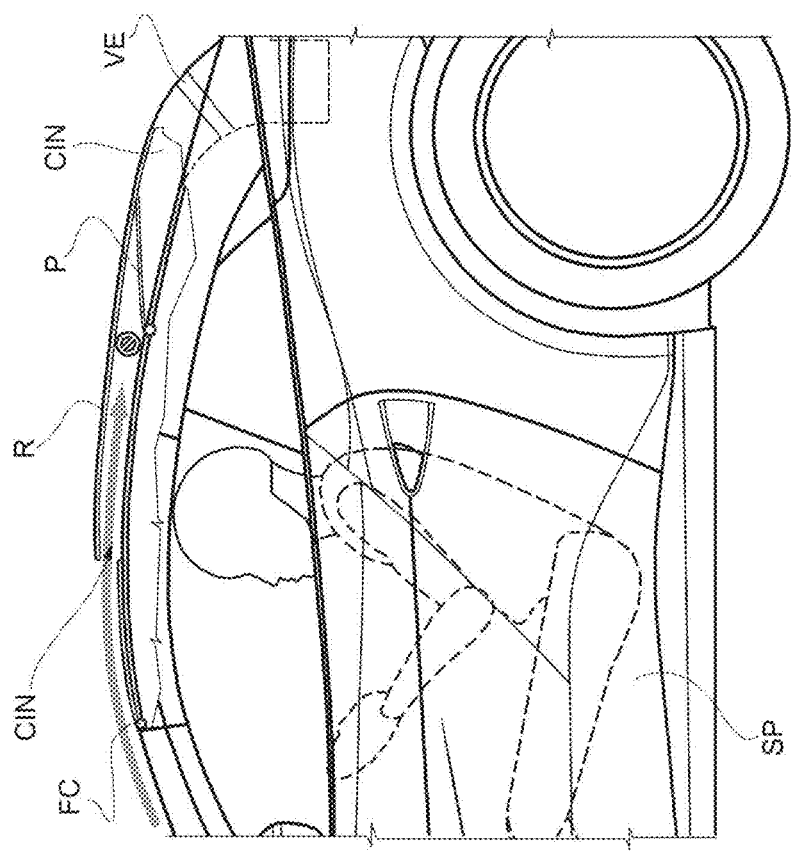
FIGS. 4a and 4b show a side view of a portion of a sports car according to another preferred example of the present invention in two different operating conditions.
Figure 4A:
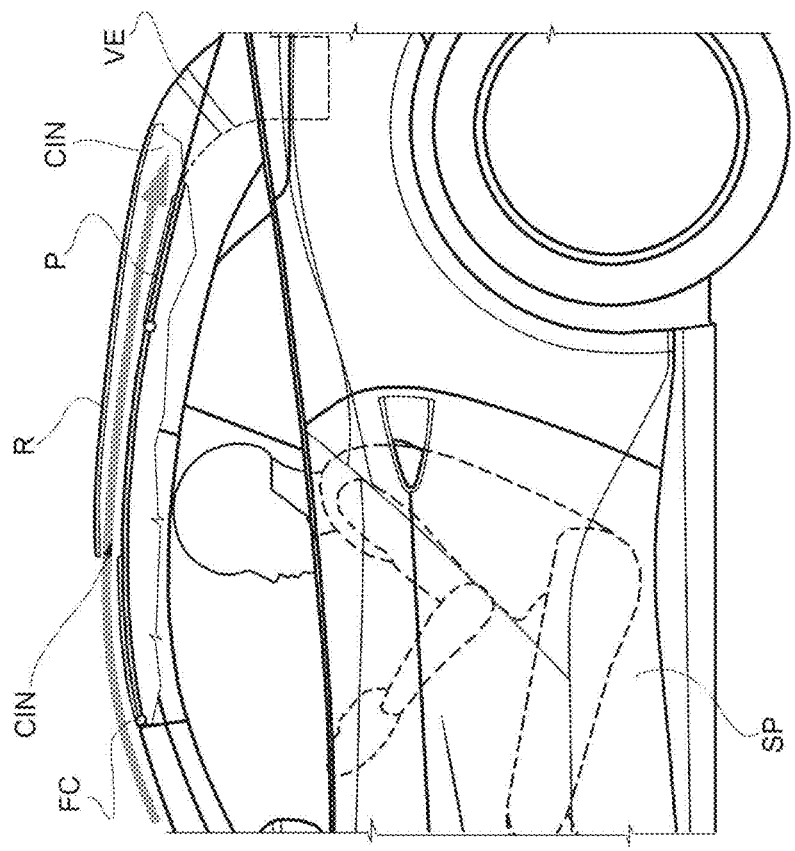

Alternatively, the movable partition can be housed inside the outer channel Cin, as shown in FIGS. 4a and 4b that show operating conditions corresponding to those of FIGS. 3a and 3b.

The air flow EAF determined by the forward motion of the car, in the first operating condition, flows on the car roof R, while in the second operating condition it is channelled until it reaches the conditioning device CD. The right portion RA and the left portion RB of the roof R, above the heads of the passengers, shown in FIG. 5, can be removed or can be folded in the roof in a manner known per se, preferably independently of one another.

The central upright is preferably internally concealed by means of a display that covers it internally and reproduces images captured by one or more cameras FC externally associated with the same upright, so that the driver does not perceive the presence of the central upright. Preferably, the camera(s) FC applied to the front central upright MC are arranged so as to be aligned with a line of sight of a car passenger. The images captured by these cameras are reproduced on the display, so that the car passenger loses the perception of the front central upright MC.

Preferably, also the front side uprights ML, which laterally delimit the windscreen, are internally lined with displays connected to as many cameras arranged outside the uprights, so that the relative displays reproduce images in real time of what has been taken up, thus concealing the existence of the uprights.

Possible embodiments of the described non-limiting example are possible without thereby departing from the scope of protection of the present invention, comprising all equivalent embodiments for a person skilled in the art. From the description given above, the person skilled in the art is able to manufacture the object of the invention without introducing further construction details. The elements and characteristics shown in the various preferred embodiments, including the drawings, can be combined with one another without, however, departing from the scope of protection of the present application. What is described in the part relating to the state of the art only provides a better understanding of the invention and does not represent a declaration of existence of what has been described. Furthermore, if not specifically excluded in the detailed description, what is described in the part relating to the state of the art is to be considered as an integral part of the detailed description.

The invention claimed is:

1. A sports car comprising a cockpit provided with a windscreen (WS) that delimits the cockpit (AB), the windscreen being supported by a peripheral frame of high-resistance material comprising an upper crossbeam (TVS) at the top, a lower crossbeam (TV) at the bottom and a pair of front side uprights (ML) connecting said upper and lower crossbeams, the windscreen comprising a front central upright (MC) arranged between said pair of front side uprights to connect said upper and lower crossbeams; and a conditioning system comprising a conditioner device (CD) for treating environmental air, a first inner channel (Cout) for delivering conditioned air generated by said conditioning device to a vehicle cockpit (AB), the car comprising a roof (R) wherein said first inner channel (Cout) is at least partially integrated and wherein said front central upright (MC) and said first inner channel define a single component for reinforcing said cockpit.

2. The car according to claim 1, wherein said first inner channel is arranged longitudinally and preferably centrally with respect to a longitudinal development of the car.

3. The car according to claim 1, further comprising a conditioning system comprising a conditioning device (CD) for treating environmental air, an outer channel (Cin) for conveying environmental air into said conditioning device (CD) and wherein said outer channel (Cin) is at least partially integrated in said roof (R), forming with said central upright (MC) a single component for reinforcing said cockpit.

4. The car according to claim 3, wherein said outer channel is arranged longitudinally and preferably centrally with respect to a longitudinal development of the car.

5. The car according to claim 4, wherein said conditioning system comprises said first inner channel integrated in said roof and arranged longitudinally and centrally with respect to said longitudinal development of the car, said outer channel being at least partially superimposed on said first inner channel.

6. The car according to claim 1, wherein said conditioning device is arranged at the rear of said cockpit (AB).

7. The car according to claim 6, wherein said sports car is a two-seat sports car and wherein said conditioning device is arranged directly at the rear of said cockpit including said two seats.

8. The car according to claim 1, wherein said front central upright (MC) passes through said windscreen (WS), thus identifying a windscreen right portion (WSA) and a windscreen left portion (WSB).

9. The sports car according to claim 8, further comprising a pair of windscreen wiper arms which, when at rest, are superimposed or close to said front central upright (MC).

10. The car according to claim 1, wherein said front central upright (MC) is entirely arranged inside or outside said cockpit.

11. The car according to claim 8, wherein said windscreen (WS) is made of a single piece.

12. The car according to claim 10, wherein said front central upright (MC) is on the outside of said cockpit and the car further comprises a pair of windscreen wiper arms which, when at rest, are aligned with said front central upright and are arranged between said front central upright and said windscreen.

13. The car according to claim 10, wherein said front central upright (MC) is inside said cockpit and the car further comprises a pair of windscreen wiper arms which, when at rest, are aligned with said front central upright and are either superimposed or close to said front central upright.

14. The car according to claim 1, wherein said first inner channel (Cout) is made of a tubular profile of high-resistance material also defining said front central upright (MC), having opposite ends, each being directly or indirectly connected to a vehicle frame (F) so as to define a reinforcement structure in case of a frontal impact and/or an overturning of the car.

15. The car according to claim 14, wherein at the rear of the vehicle, said first inner channel (Cout) is directly connected to said frame (F) by means of a rear central upright (MPC) or by means of side rear uprights (MPL) that protrude from a tail of the car towards said roof, thus defining a Y-shaped structure.

16. The car according to claim 1, wherein said central upright (MC) is internally concealed by a display that covers it and displays images captured by one or more cameras (FC), externally associated with the same upright and aligned with a line of sight of a driver of said sports car.

17. The car according to claim 1, wherein at least one of said front side uprights (ML) is internally concealed by a display that covers it and displays images captured by one or more cameras (FC) externally associated with the same upright.

* * * * *